June 9, 1959 W. J. WHITE ET AL 2,889,878
SOD CUTTING MACHINE WITH GRAVITY FEED MEANS
Filed March 7, 1956 3 Sheets-Sheet 3
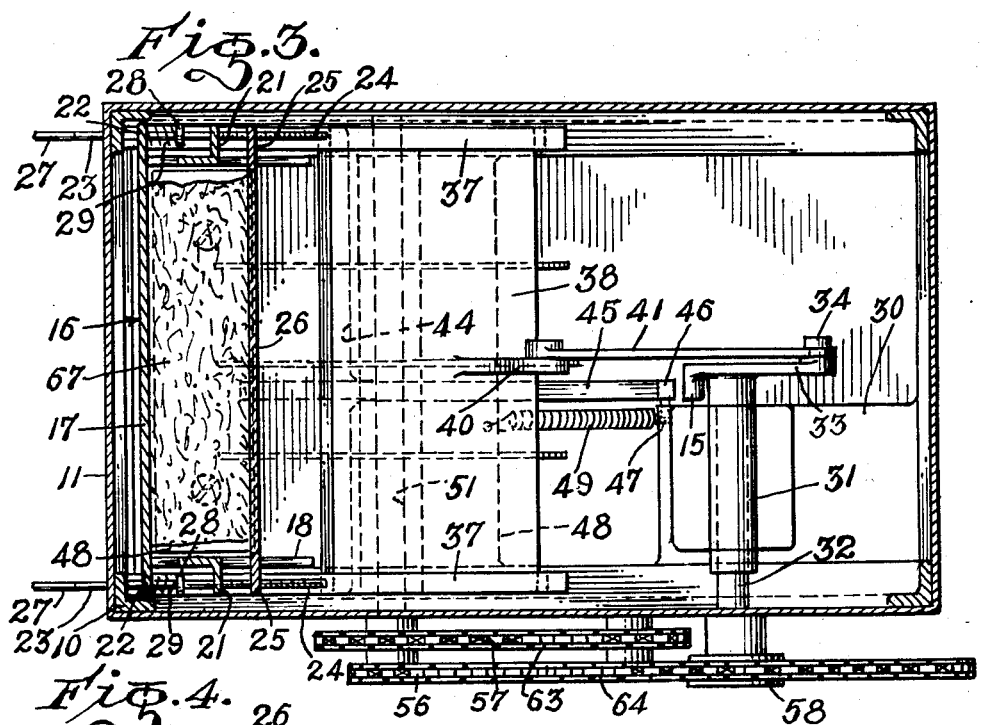
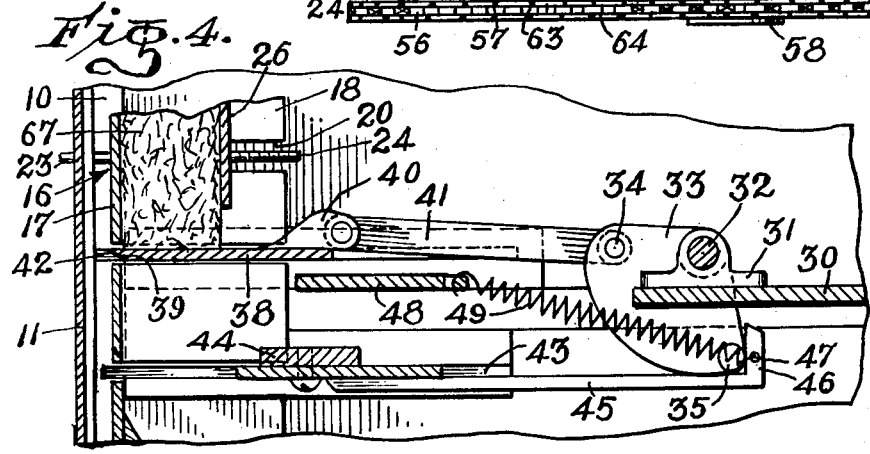
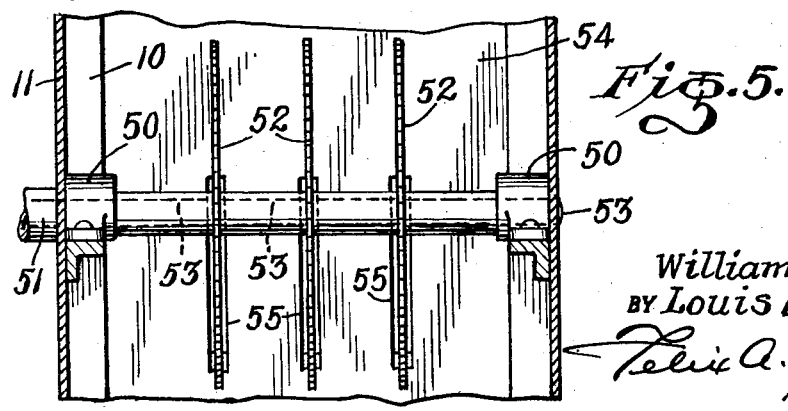
INVENTORS
William J. White &
BY Louis Besterda
ATTORNEY

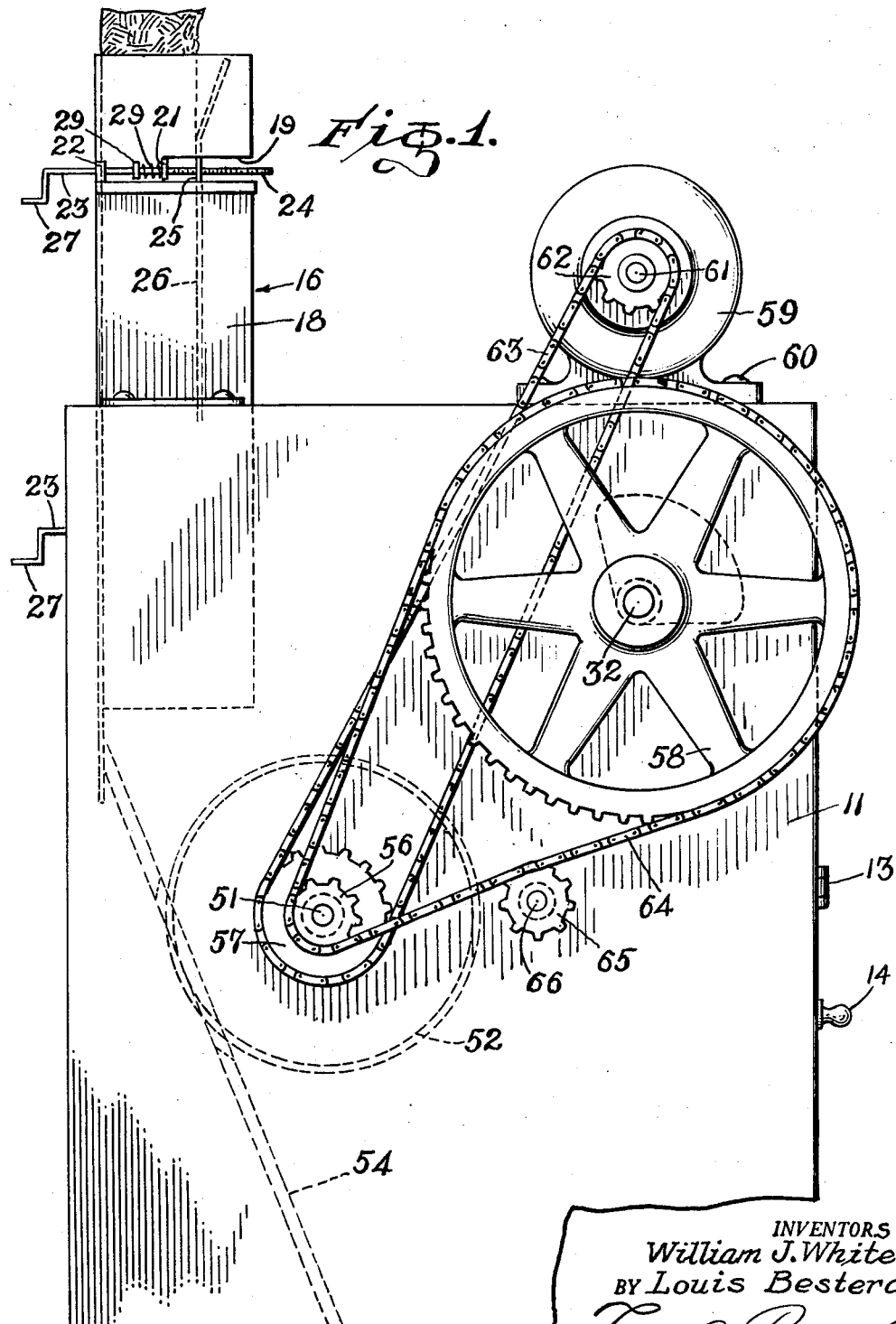

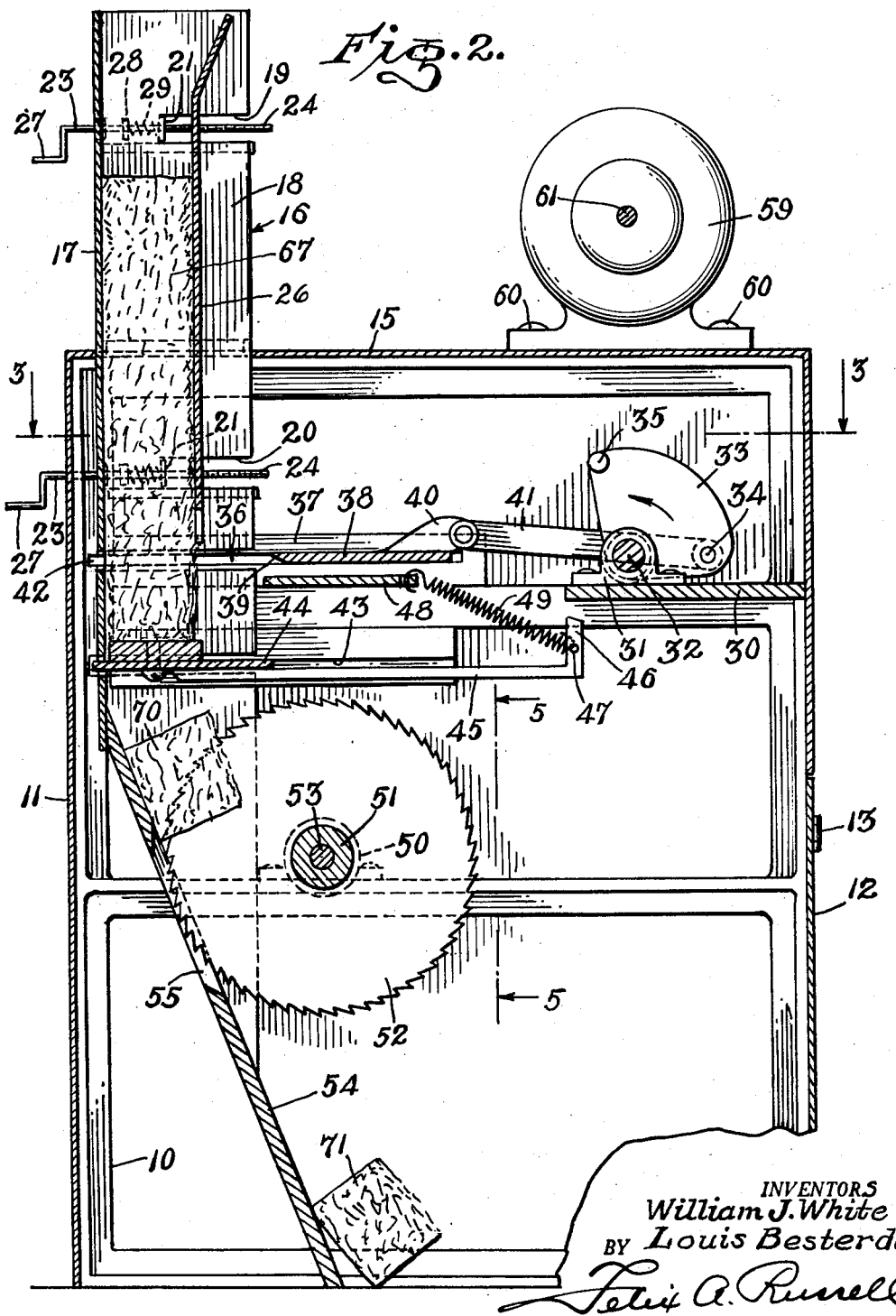

2,889,878
SOD CUTTING MACHINE WITH GRAVITY FEED MEANS

William J. White and Louis Besterda,
Fort Lauderdale, Fla.

Application March 7, 1956, Serial No. 570,158

1 Claim. (Cl. 164—48)

The present invention relates to a sod cutting machine and it consists in the combinations, constructions and arrangements of parts herein described and claimed.

Generally there is provided a machine adapted to receive therein relatively large pieces of sod and automatically cut the same into relatively small pieces. Novel means is provided for adjusting the mechanism of the machine whereby the size of the small pieces of sod may be regulated with exactness. The machine contains many novel features which will be hereinafter set forth.

It is accordingly an object of the invention to provide a novel sod cutting machine having automatic means for severing large pieces of sod into relatively small pieces.

Another object of the invention is to provide novel means for adjusting a chute forming a part of the invention.

Still another object of the invention is to provide, in a machine of the character set forth, novel means for adjusting the cutting positions of certain saws forming a part of the invention.

A further object of the invention is to provide, in a machine of the character set forth, novel means for holding a column of sod in position prior to severing a portion thereof by a cutting knife forming a part of the invention.

Other and further objects of the invention will become apparent from a reading of the following specification taken in conjunction with the drawings, in which:

Figure 1 is a side elevational view of an embodiment of the invention,

Figure 2 is a vertical sectional view thereof,

Figure 3 is a sectional view taken along line 3—3 of Figure 2,

Figure 4 is an enlarged fragmentary sectional view illustrating certain details of the invention, and Figure 5 is an enlarged fragmentary sectional view taken substantially along line 5—5 of Figure 2.

Referring more particularly to the drawings, there is shown therein a sod cutting machine comprising a frame 10 to the outer side of which is attached a casing 11 provided with an access door 12 hinged as indicated at 13 and provided with the usual handle 14. The casing 11 includes a top wall 15 to which extends a chute generally indicated at 16 and which consists of a rear wall 17 and a pair of integrally formed forwardly extending side walls 18 each having a pair of vertically spaced rearwardly extending slots 19 and 20 in the forward portion thereof. At the rearward end of each of the slots 19 and 20, each of the side walls 18 is provided with an outwardly extending ear 21 and, in horizontal alignment with each of the ears 21 there is provided a rearward ear 22 affixed to the rear wall 17.

Four horizontal shafts 23 are provided and the lower pair thereof extend revolubly through the casing 11, the frame 10 and one of the ears 22 and its associated ear 21, while the upper pair thereof extends through the remaining ears 21 and 22. The forward portion of each of the shafts 23 is threaded, as indicated at 24 and is threadably engaged in an ear 25 extending laterally outwardly from a movable vertical plate 26, it being apparent that four such ears are provided on the plate 26.

Each of the shafts 23 is provided at its rear end with a crank handle 27 and, intermediate the ears 21 and 22 with a fixed collar 28, between which and the associated ear 21 is interposed a compression spring 29 which surrounds its respective shaft 23 and bears against the collar 28 and ear 22 in each case.

In spaced relation to the top thereof, there is mounted within the frame 10 and adjacent one side and the forward end thereof a shelf 30 upon which is affixed a transversely extending bearing 31 in which is revolubly mounted a shaft 32 to the inner end of which is affixed a segmental plate 33. A stub shaft 34 extends outwardly from one end of the peripheral portion of the plate 33 while a detent 35 extends inwardly from the other end of the peripheral portion of the plate 33.

Horizontally slidable in slots 36 formed in a pair of inwardly extending guide members 37 affixed to either side of the rearward portion of the frame 10 is a transversely extending blade 38 having a sharpened rearward end 39. The blade is centrally provided upon its upper side with an upwardly extending dog 40 and a link 41 pivotally interconnects the dog 40 and stub shaft 34. The slots 36 extend to points rearward of the rear wall 17 of the chute 16 and register with a horizontal slot 42 in the rear wall 17.

Slidably mounted in guideways 43 carried on either side of the frame 10 in spaced relation below the blade 38 is a movable stop member 44 from which projects forwardly a horizontal arm 45 having an upturned detent 46 at its forward end. A stud 47 extends laterally from the detent 46 and is interconnected with a cross bar 48 by means of a tension spring 49, the cross bar being carried by the frame 10.

Revolubly mounted in bearings 50 carried by the frame 10 and extending transversely of the frame in spaced relation below the stop member 44 is a shaft 51 upon which is affixed in laterally spaced relation a plurality of circular saw blades 52, the spacing of such blades being accomplished by means of interchangeable sleeves 53. A forwardly and downwardly extending slide 54 extends from the lowermost end of the rear wall 17 of the chute 16 to the bottom of the frame 10 and is provided with a plurality of vertically extending slots 55 for the partial reception therein of the saw blades 52.

The outer end of the shaft 51 is provided with a relatively small sprocket 56 and a relatively large sprocket 57. A still larger sprocket 58 is affixed to the outer end of the shaft 32. A motor 59 is affixed as by bolts 60 or the like atop the forward portion of the casing 12 and is provided with a shaft 61 having a sprocket 62 affixed to the outer end thereof. A chain 63 interconnects the sprockets 62 and 57 while a chain 64 interconnects the sprockets 56 and 58. An idler sprocket 65 for the purpose of taking up slack in the chain 64 is mounted upon a suitable stub shaft 66 carried by the frame 10.

In operation, it will be apparent that relatively large pieces of sod 67, measuring usually one foot by two feet in actual practice, may be placed within the chute 16 in a vertical position, as clearly shown in Figure 2. The effective width of the chute may then be adjusted to the thickness of the sod piece 67 by manipulating the crank handles 27 to bring the forward wall 26 toward or away from the fixed rear wall 17.

It will now be understood that as the machine is operated by the motor 59, the segmental wheel 33 will be moved in an anti-clockwise direction as viewed, for example, in Figure 2 thus causing a reciprocation of the cutting blade 38 with the sharpened end 39 thereof severing that portion of the sod piece 67 which rests upon the movable stop member 44. It will also be apparent that for each revolution of the shaft 32, one such cutting operation will take place when the stop member 44 is beneath the sod piece 67 to support the same and that, as the shaft 32 continues to revolve the member 35 will come into contact with the detent 46 to move the same forwardly against the action of the spring 49 to thus release the severed portion of the sod piece 67 so that the same may fall by gravity upon the slide 54, as indicated at 70. The severed portion 70 will now come into contact with the rapidly revolving saw teeth 52 to be further divided vertically into a plurality of relatively small pieces of sod, as indicated at 71 whereupon the same will continue to fall by gravity down the slide 54 to be delivered in any suitable manner as, for example, into packages awaiting the same. Thus it will be seen that by placing ordinary sized sod pieces 67, that is to say in the usual size as removed from the ground, in the chute 16, the mechanism of the present invention will deliver relatively small pieces of sod 71 or "plugs" as they are now designated in the trade, to the lower end of the machine.

While but one form of the invention has been shown and described herein, it will be readily apparent to those skilled in the art that many minor modifications may be made without departing from the spirit of the invention or the scope of the appended claim.

What is claimed is:

A sod cutting machine comprising a frame, a chute mounted in the upper portion of said frame, means for receiving a relatively large piece of sod in said chute, a horizontally movable support in the lower end of said chute for said large piece of sod, a horizontally reciprocating blade, having a cutting edge, movable through and out of said chute in vertical spaced relation above said support, a shaft mounted in said frame in spaced parallel relation to the cutting edge of said blade, a segmental plate affixed to said shaft, a link interconnecting the blade with one end of the peripheral portion of said plate, a lateral detent extending from the other end of the peripheral portion of the plate, a horizontal arm extending from said support to a position subjacent said shaft, an upstanding detent affixed to the free end of said horizontal arm, a spring interconnecting the frame and said upstanding detent to normally urge said support to a position beneath said chute, the parts being so constructed and arranged that on each revolution of the shaft and plate the lateral detent engages the upstanding detent as the blade is moved to a position of engagement with sod carried by said chute, whereby to completely remove from and allow the complete return of said support to its normal position whereby to free a severed portion of sod while said blade is in complete support of the unsevered portion of said relatively large piece of sod.

References Cited in the file of this patent

UNITED STATES PATENTS

| | | |
|---|---|---|
| 864,349 | Yager | Aug. 27, 1907 |
| 1,279,678 | English | Sept. 24, 1918 |
| 1,376,410 | Diskin | May 3, 1921 |
| 1,626,227 | Dixon | Apr. 26, 1927 |
| 2,209,412 | Lupo | July 30, 1940 |
| 2,214,478 | Rosenthal | Sept. 10, 1940 |
| 2,452,706 | White | Nov. 2, 1948 |
| 2,526,976 | Smith | Oct. 24, 1950 |
| 2,541,319 | Young | Feb. 13, 1951 |
| 2,549,747 | Leeson | Apr. 17, 1951 |
| 2,581,960 | Krunenwetter | Jan. 8, 1952 |
| 2,616,501 | Smith | Nov. 4, 1952 |